US009239380B2

(12) United States Patent
Hegemann et al.

(10) Patent No.: US 9,239,380 B2
(45) Date of Patent: Jan. 19, 2016

(54) DRIVER ASSISTANCE SYSTEM FOR AVOIDING COLLISIONS OF A VEHICLE WITH PEDESTRIANS

(75) Inventors: Stefan Hegemann, Wangen (DE); Akitsugu Yoda, Lindau (DE); Rolf Adomat, Eriskirch (DE); Michael Darms, Lindau (DE); Raksincharoensak Pongsathorn, Tokyo (JP); Masao Nagai, Tokyo (JP); Ikuko Shimizu, Tokyo (JP)

(73) Assignee: ADC Automotive Distance Control Systems GmbH (DE)

( * ) Notice: Subject to any disclaimer, the term of this patent is extended or adjusted under 35 U.S.C. 154(b) by 255 days.

(21) Appl. No.: 12/992,174

(22) PCT Filed: May 14, 2009

(86) PCT No.: PCT/EP2009/003427
§ 371 (c)(1),
(2), (4) Date: Feb. 10, 2011

(87) PCT Pub. No.: WO2009/141092
PCT Pub. Date: Nov. 26, 2009

(65) Prior Publication Data
US 2011/0184617 A1  Jul. 28, 2011

(30) Foreign Application Priority Data

May 21, 2008  (DE) .......................... 10 2008 024 707
Sep. 1, 2008  (EP) ..................................... 08015394

(51) Int. Cl.
B60T 7/22 (2006.01)
B60W 30/08 (2012.01)
(Continued)

(52) U.S. Cl.
CPC .................. *G01S 13/867* (2013.01); *B60T 7/22* (2013.01); *G01S 7/415* (2013.01); *G01S 13/931* (2013.01); *G06K 9/00798* (2013.01);
(Continued)

(58) Field of Classification Search
CPC .............. B60Q 1/00; G08G 1/16; B60T 7/12; G06K 9/00
USPC ............................... 701/70, 1; 340/435, 425.5
See application file for complete search history.

(56) References Cited

U.S. PATENT DOCUMENTS 5,025,245 A * 6/1991 Barke ........................... 340/471
5,265,172 A * 11/1993 Markandey et al. .......... 382/107
(Continued)

FOREIGN PATENT DOCUMENTS

DE       10341753 A1    4/2005
EP       1 095 832 A1   5/2001
(Continued)

OTHER PUBLICATIONS

Japanese Application Serial No. 2011-510864, Office Action mailed Jun. 28, 2013, 10 pgs.

*Primary Examiner* — Calvin Cheung
*Assistant Examiner* — Martin Weeks
(74) *Attorney, Agent, or Firm* — RatnerPrestia

(57) ABSTRACT

A driver assistance system for avoiding collisions of a vehicle with pedestrians, the system including a camera sensor and/or a beam sensor. When an object moving at a given speed on a pedestrian crossing is detected, the object is detected as being a pedestrian with a probability that is sufficiently high to output a warning to the driver, reducing the likelihood of a potential collision.

14 Claims, 2 Drawing Sheets

(51) Int. Cl.
*G01S 13/86* (2006.01)
*G01S 7/41* (2006.01)
*G01S 13/93* (2006.01)
*G06K 9/00* (2006.01)
*G08G 1/16* (2006.01)
*B60R 21/0134* (2006.01)
*G01S 17/02* (2006.01)

(52) U.S. Cl.
CPC ........... *G06K 9/00805* (2013.01); *G08G 1/166* (2013.01); *B60R 21/0134* (2013.01); *B60R 2300/8093* (2013.01); *B60W 30/08* (2013.01); *G01S 17/023* (2013.01); *G01S 2013/936* (2013.01); *G01S 2013/9321* (2013.01); *G01S 2013/9346* (2013.01); *G06K 2209/27* (2013.01)

(56) References Cited

U.S. PATENT DOCUMENTS

| | | | |
|---|---|---|---|
| 5,432,509 A | 7/1995 | Kajiwara | |
| 5,825,413 A * | 10/1998 | Mullis | 348/155 |
| 6,191,704 B1 * | 2/2001 | Takenaga et al. | 340/903 |
| 6,337,637 B1 * | 1/2002 | Kubota et al. | 340/901 |
| 6,771,208 B2 * | 8/2004 | Lutter et al. | 342/52 |
| 6,956,469 B2 * | 10/2005 | Hirvonen et al. | 340/435 |
| 7,771,208 B2 * | 8/2010 | Hougham et al. | 439/66 |
| 2004/0258279 A1 * | 12/2004 | Hirvonen et al. | 382/104 |
| 2005/0128063 A1 * | 6/2005 | Isaji et al. | 340/439 |
| 2005/0280518 A1 * | 12/2005 | Bartels | B60Q 1/2665 340/435 |
| 2006/0055525 A1 * | 3/2006 | Kubota et al. | 340/461 |
| 2007/0041614 A1 * | 2/2007 | Tanji | 382/104 |
| 2007/0124027 A1 * | 5/2007 | Betzitza et al. | 701/1 |
| 2007/0223785 A1 * | 9/2007 | Sano | 382/103 |
| 2008/0068520 A1 * | 3/2008 | Minikey et al. | 349/11 |
| 2008/0243312 A1 * | 10/2008 | Nakamura et al. | 701/1 |

FOREIGN PATENT DOCUMENTS

| | | |
|---|---|---|
| EP | 1 494 194 A2 | 1/2005 |
| JP | 2001351200 A | 12/2001 |
| JP | 200522578 A | 1/2005 |
| JP | 200592516 A | 4/2005 |
| JP | 2005309797 A | 11/2005 |
| JP | 2006185406 A | 7/2006 |
| JP | 2007122536 A | 5/2007 |
| JP | 2007188417 A | 7/2007 |
| JP | 2007316790 A | 12/2007 |
| JP | 200821196 A | 1/2008 |
| JP | 2008174212 A | 7/2008 |
| JP | 2009-271766 A | 11/2009 |
| WO | WO 02/13162 A1 | 2/2002 |
| WO | WO2008075407 A1 | 6/2008 |

* cited by examiner

DRIVER ASSISTANCE SYSTEM FOR AVOIDING COLLISIONS OF A VEHICLE WITH PEDESTRIANS

CROSS REFERENCE TO RELATED APPLICATIONS

This application is the U.S. national phase application of PCT International Phase Application No. PCT/EP2009/03427, filed May 14, 2009, which claims priority to German Patent Application No. 10 2008 024 707.3, filed May 21, 2008, and European Patent Application No. 08015394.3, filed Sep. 1, 2008, the contents of such applications being incorporated by reference herein.

FIELD OF THE INVENTION

The invention relates to a driver assistance system that helps to avoid collisions of a vehicle with pedestrians. The invention is applied, for example, in motor vehicles.

BACKGROUND OF THE INVENTION

Statistically, more than 30% of all road casualties are pedestrians, both in Japan and in Germany. Statistics prove that there is a high danger of accidents for pedestrians within built-up areas.

According to the state of the art, driver assistance systems are known that prevent a collision of a motor vehicle with pedestrians or at least mitigate the consequences of an accident for the pedestrian.

Known approaches infer the presence of a pedestrian directly by the detection of features that concern a pedestrian. For example, pedestrians are classified directly in the image or in the sequence of images of a camera sensor and/or of a radar sensor. These driver assistance systems are based, for example, on a detection of the pedestrian by means of a video image camera system. However, the detection of a pedestrian from image data requires a high computational capacity.

As an alternative, a thermal imaging camera may be used for the detection of pedestrians. However, the disadvantage of this solution consists in the fact that a thermal imaging camera is very expensive.

A lot of accidents with pedestrians happen in places where there are conclusive features in the surroundings that help to infer the possible presence of pedestrians. Typical examples comprise pedestrian crossings or zebra crossings.

DE 10341753 A1, which is incorporated by reference herein, shows a device for detecting an approach to a pedestrian crossing in a vehicle, wherein the device generates a signal that identifies the approach, wherein the approach to the pedestrian crossing may be detected by means of a locating device (e.g. GPS) or a surroundings sensor technology (e.g. video sensor technology).

SUMMARY OF THE INVENTION

It is an object of the present invention to provide a cost-effective driver assistance system for avoiding collisions with pedestrians that provides increased reliability as against the solutions known from the state of the art.

According to aspects of the invention, this object is achieved by a driver assistance system and a device for a driver assistance system.

The invention described herein goes one step further and also uses features usually found near pedestrians in order to infer the presence of a pedestrian indirectly. In general, these features are clearly defined and may be detected more easily as far as the computational effort is concerned. Within the scope of this invention, the term "pedestrian" also comprises wheelchair users, cyclists etc.

For example, an object that is moving at a given speed on a pedestrian crossing or zebra crossing may be interpreted as being a pedestrian with a probability that is sufficiently high to output a warning to the driver and to thereby prevent a potential collision. The zebra crossing is clearly defined by the traffic regulations of the corresponding country. For example, the motion may be detected using robust approaches, such as beam sensors or optical flow method.

One embodiment of the invention provides a pedestrian collision warning system in which the information about the presence of a pedestrian is based on the information determined by the vehicle camera and a beam sensor, e.g. a millimeter wave radar.

The concept of the system consists in interpreting all objects moving on or near a zebra crossing as being pedestrians. For example, the image processing algorithm for evaluating the images recorded by the vehicle camera is adapted to detect the presence of a zebra crossing in front of the vehicle. The technique used for extracting the features in the algorithm is based, for example, on the cross ratio between the edges of the zebra crossing and the periodicity of the markings of the zebra crossing.

According to a further embodiment of the invention, the detected position of the zebra crossing on the one hand and e.g. the position and the speed of the moving object determined by the millimeter wave radar on the other hand are superimposed on each other in order to conclude therefrom that there is a pedestrian on the zebra crossing in front of the vehicle. In some embodiments, a warning is outputted to the driver when there is a possibility of a collision.

The warning on account of the merged sensor data may be a two-stage warning. When a zebra crossing in front of the vehicle is detected, the warning is yellow (first stage). When a moving object is detected on or near a zebra crossing, the warning is red (second stage).

The robustness of the overall system may be increased if the solution presented herein is combined with algorithms for direct classification.

This permits, at least one, more intensive interventions for some scenarios, such as an automatic emergency braking.

Further embodiments of the invention provide alternative possibilities of zebra crossing detection. A driver assistance system for the protection of pedestrians for a motor vehicle with a zebra crossing detection function and an output unit is provided. When the vehicle is approaching a zebra crossing, the output unit is activated and a warning is outputted. This warning may also be outputted in dependence on the speed of the vehicle. When a vehicle is approaching a zebra crossing too fast, the output unit is activated.

In another embodiment of the invention, the speed of the motor vehicle is reduced automatically when it is above a predetermined threshold value when the vehicle is approaching the zebra crossing, thereby ensuring that a vehicle is approaching a zebra crossing slowly. The speed may only be reduced after a warning, when the driver does not react within a predetermined period of time.

In another exemplary embodiment, the warning is outputted optically or acoustically in order to draw the driver's attention to a zebra crossing in front of the vehicle.

Zebra crossing detection methods are described in the following:

A zebra crossing may be detected by a camera system for the detection of the surroundings in the motor vehicle.

To this end, a suitable image processing algorithm is stored in the camera system, which algorithm detects a zebra crossing in front of the vehicle by means of edge selection methods or color recognition methods or pattern recognition methods or similar methods.

A further embodiment of the invention provides a camera-based traffic sign recognition function, wherein the recognition function recognizes a traffic sign that refers to a zebra crossing.

Another embodiment of the invention provides that the vehicle is equipped with an electronic map. The electronic map contains the positions of zebra crossings. The position of the vehicle may be determined by means of a navigation device, e.g. a GPS receiver.

The information about the existence of a zebra crossing in the direction of traffic may be transmitted by vehicles driving ahead by means of car-to-car communication.

The zebra crossing detection methods mentioned above may contribute to the invention individually or in combination with each other. For example, zebra crossing detection may be realized in such a manner that a zebra crossing is detected using two or more of the presented methods: A region in which a zebra crossing is very likely to exist is identified by means of the electronic map or traffic sign recognition. This assumption is verified or rejected by analyzing the image data of the camera system in the roadway region in front of the vehicle.

Solutions for avoiding collisions with pedestrians known from the state of the art have difficulty in e.g. detecting a crowd of people or pedestrians since these differ from the learned classification patterns (size, volume, clothes, bags, accessories such as bicycles, etc.).

The solution presented herein is advantageous since it does not have to search for such features, but searches for clearly defined features, such as a zebra crossing. This enables the driver assistance system to react in scenarios that are less clear, such as if the presented solution is combined with algorithms that are already known.

The detection of the clearly defined features in the surroundings requires less computational effort compared to the direct detection of a pedestrian. This results in a system that is more cost-effective.

An inventive further development with two independent sensors provides an increased robustness of the driver assistance system and a lower susceptibility of said system to errors as against solutions with only one (camera) sensor. Both sensors can detect moving objects, whereby the detection of a pedestrian may be verified.

The advantage of combining radar data with information from a digital map or from vehicles driving ahead consists in the fact that effectual warnings may be outputted even in poor visibility.

In the following, the invention is explained on the basis of exemplary embodiments and figures.

BRIEF DESCRIPTION OF THE DRAWINGS

The invention is best understood from the following detailed description when read in connection with the accompanying drawings. Included in the drawings is the following figures.

DETAILED DESCRIPTION OF THE PREFERRED EMBODIMENTS

Figure 1:
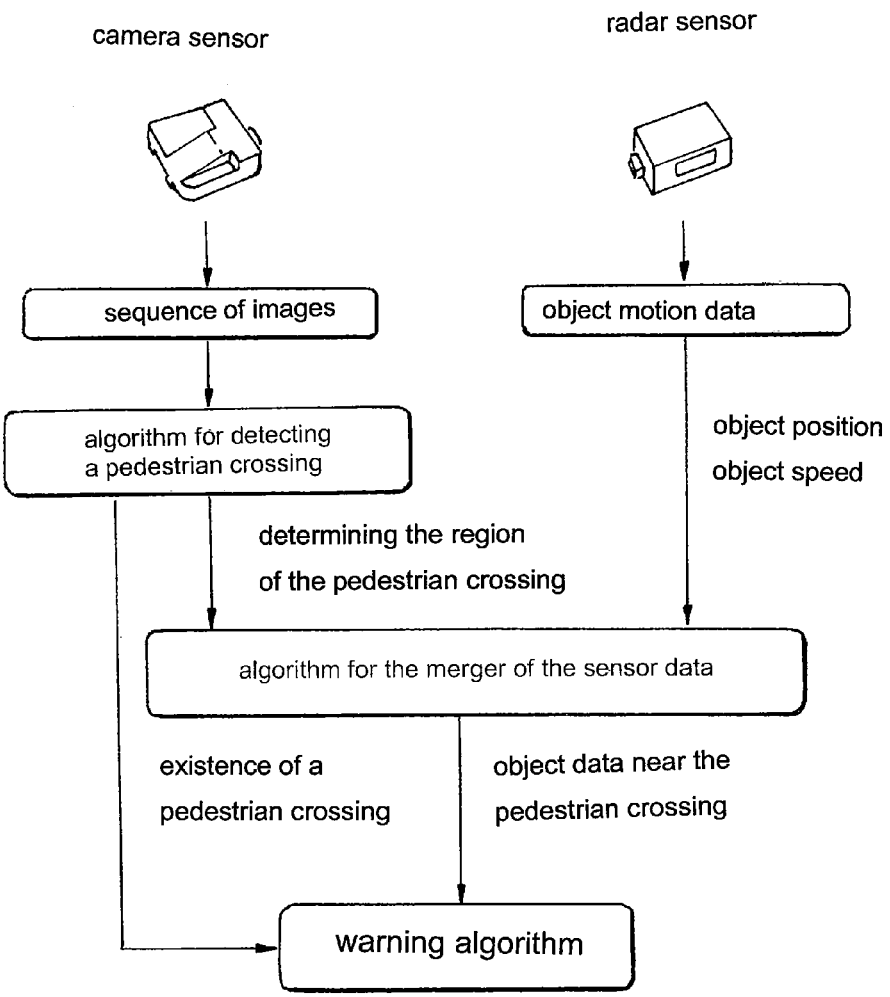
FIG. 1 shows a schematic diagram of a pedestrian collision warning system.

FIG. 1 shows an exemplary embodiment of the architecture of a pedestrian collision warning system. A camera sensor, e.g. a CMOS sensor or a CCD sensor, records a sequence of images of the surroundings of the vehicle. The images are examined for the existence of a pedestrian crossing by means of an algorithm. When a pedestrian crossing is detected, the region in which the pedestrian crossing is positioned is delivered to an algorithm for the merger of the sensor data and the information about the existence of a pedestrian crossing is transmitted to a warning algorithm.

A beam sensor, e.g. a millimeter wave radar or a lidar, detects objects that are moving in the surroundings of the vehicle. The position and the speed (including the moving direction) of detected objects are delivered to the algorithm for the merger of the sensor data, whereupon this algorithm superimposes the region of the detected pedestrian crossing on the one hand and the object position and the object speed on the other hand on each other in order to obtain the "object data near the pedestrian crossing". These data are delivered to the warning algorithm. The warning algorithm evaluates the obtained data and initiates the outputting of a warning to the driver when there is a danger of a collision with a pedestrian. The warning may be a two-stage warning (see FIG. 2a and FIG. 2b). A danger exists when the sensor merger algorithm determines that an object is moving in the region of a pedestrian crossing at a speed that is characteristic of a pedestrian. As an alternative to the illustrated architecture, the pedestrian collision warning system may be realized with only one camera sensor. For this purpose, a camera data evaluation is necessary that may detect the motion of objects using an optical flow method, for example. These data replace the data of the radar sensor shown in FIG. 1, whereby the merger of the sensor data is considerably facilitated.

Instead of the shown use of a mono camera as a camera sensor, it is also possible to use a stereo camera system. In this case, additional object data may be obtained, such as the size of objects, which facilitates the classification of objects as being pedestrians or increases the reliability of said classification.

Figure 2A:
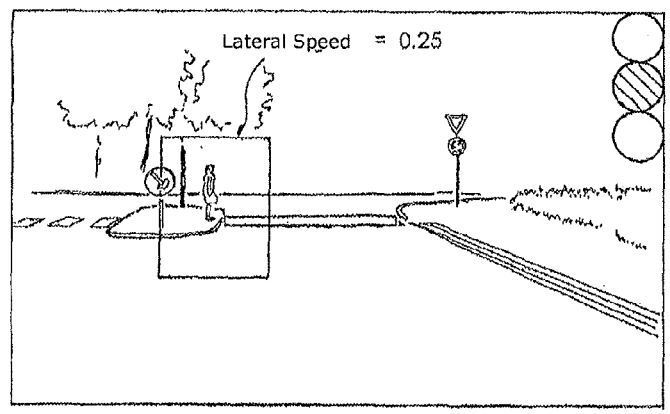
FIG. 2 shows a graphic warning system based on the results of the detection of pedestrians.
Figure 2B:
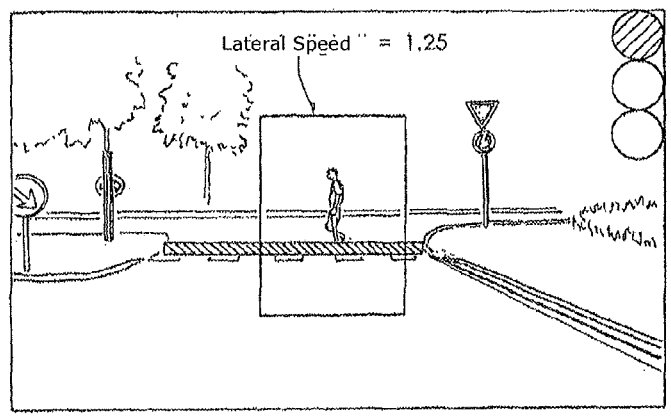

FIG. 2a and FIG. 2b show a two-stage visual warning. FIG. 2a shows a situation in which a pedestrian crossing was detected. A first warning stage, e.g. in the form of a yellow warning level, is indicated to the driver. There is an object to the side of and next to the region of the pedestrian crossing. However, this object is not taken into consideration since it is not moving.

FIG. 2b, on the other hand, shows a situation in which a pedestrian crossing was detected and an object moving on the pedestrian crossing was detected. This object is interpreted as being a moving pedestrian. A second warning stage, e.g. in the form of a red warning level, is indicated to the driver. When the driver does not react to the warning, an automatic emergency braking may be carried out in such a situation in order to prevent a collision or to mitigate the consequences of the collision.

The invention claimed is:

1. A driver assistance system on a vehicle for avoiding collisions of the vehicle with pedestrians, the system on the vehicle comprising:
   a camera sensor, on the vehicle, for capturing images of a roadway;
   a beam sensor, on the vehicle, for detecting a position of an object located on the roadway; and a processor, on the vehicle, for:
- analyzing the captured images output by the camera sensor to identify a position of a pedestrian crossing which is a designated portion of the roadway for assisting pedestrians crossing the roadway,
- analyzing a detection signal output from the beam sensor to identify that the detected object is a pedestrian,
- in response to identifying the position of the pedestrian crossing and identifying that the detected object is a pedestrian, merging the position data, by superimposing the position of the identified pedestrian relative to the position of the identified pedestrian crosswalk, and
- in response to the superimposing performed by the merging, determining that the position of the identified pedestrian is on or near the position of the identified pedestrian crossing and outputting a warning to the driver of the vehicle, and
- wherein data from at least two of the camera sensor, the beam sensor, a digital map and other vehicles driving ahead are superimposed on each other in order to determine whether an object is moving on or near a pedestrian crossing.

2. The driver assistance system according to claim 1, wherein the camera sensor detects the pedestrian crossing.

3. The driver assistance system according to claim 2, wherein a pedestrian crossing is detected from camera data on the basis of the cross ratio between edges of the pedestrian crossing and the periodicity of markings of the pedestrian crossing.

4. The driver assistance system according to claim 2, wherein a pedestrian crossing is detected from camera data on the basis of a traffic sign that refers to a pedestrian crossing.

5. The driver assistance system according to claim 2, wherein the position and the motion of objects are detected from camera data by means of an optical flow method.

6. The driver assistance system according to claim 1, wherein a beam sensor detects a position and a motion of an object.

7. The driver assistance system according to claim 1, wherein data from a digital map are used for determining a position of a pedestrian crossing a path of the vehicle.

8. The driver assistance system according to claim 1, wherein a position of a pedestrian crossing in a direction of traffic is transmitted by other vehicles driving ahead by means of car-to-car communication.

9. The driver assistance system according to claim 1, wherein additional pedestrians are directly classified from the camera data.

10. The driver assistance system according to claim 1, wherein a speed of the vehicle is reduced automatically when it is above a predetermined threshold value when the vehicle is approaching a zebra crossing.

11. The driver assistance system according to claim 1, wherein an emergency braking is carried out when the driver does not react to a warning.

12. A device for a driver assistance system on a vehicle comprising:
- a camera sensor, on the vehicle, for capturing images of a roadway;
- a beam sensor on the vehicle, for detecting a position of an object located on the roadway; and
- a processor, on the vehicle, for:
  - analyzing the captured images output by the camera sensor to identify a position of a pedestrian crossing which is a designated portion of the roadway for assisting pedestrians crossing the roadway,
  - analyzing a detection signal output from the beam sensor to identify that the detected object is a pedestrian,
  - in response to identifying the position of the pedestrian crossing and identifying that the detected object is a pedestrian, merging the position data, by superimposing the position of the identified pedestrian relative to the position of the identified pedestrian crosswalk, and
  - in response to the superimposing performed by the merging, determining that the position of the identified pedestrian is on or near the position of the identified pedestrian crossing and is moving at a given speed and outputting a warning to the driver to prevent a potential collision between the vehicle and the detected object, and
  - wherein data from at least two of the camera sensor, the beam sensor, a digital map and other vehicles driving ahead are superimposed on each other in order to determine whether an object is moving on or near a pedestrian crossing.

13. The driver assistance system according to claim 1, wherein the processor:
- outputs a first internal vehicle warning to the driver of the vehicle in response to identifying the pedestrian crossing, and
- outputs a second internal vehicle warning to the driver of the vehicle that is different than the first warning in response to determining that the detected object is a pedestrian located on the identified pedestrian crossing.

14. The driver assistance system according to claim 1, wherein the processor:
- determines that a danger exists when it is determined from the sensor data that the object is moving on or near the pedestrian crossing at a speed characteristic of a pedestrian.

* * * * *